(12) United States Patent
Vodermayer et al.

(10) Patent No.: US 6,805,939 B1
(45) Date of Patent: *Oct. 19, 2004

(54) AREALLY EXTENDED COMPOSITE MATERIAL WITH FIBERS AND PLASTIC IMPREGNATION

(75) Inventors: Albert Maria Vodermayer, Dietlikon (CH); Wolfram Fritz. W. Auersch, Wiesendangen (CH)

(73) Assignee: Arova Schaffhausen AG, Schaffhausen (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/724,845

(22) Filed: Nov. 28, 2000

(30) Foreign Application Priority Data

Dec. 3, 1999 (EP) ............................................. 99811116

(51) Int. Cl.[7] .............................. D04H 3/00; B32B 5/12
(52) U.S. Cl. ...................... 428/113; 428/114; 428/131; 428/196
(58) Field of Search ................................. 428/114, 102, 428/103, 113, 194, 292.1, 131, 196, 228

(56) References Cited

U.S. PATENT DOCUMENTS

| | | | |
|---|---|---|---|
| 3,930,091 A | 12/1975 | Lewis | 428/198 |
| 3,983,282 A | 9/1976 | Seemann | 428/114 |
| 4,407,885 A * | 10/1983 | Murphy et al. | 428/246 |
| 4,440,819 A * | 4/1984 | Rosser et al. | 428/107 |
| 4,778,717 A * | 10/1988 | Fitchmum | 428/246 |
| 4,931,345 A * | 6/1990 | Bottger et al. | 428/116 |
| 5,212,010 A | 5/1993 | Curzio | 428/260 |
| 5,401,564 A * | 3/1995 | Lee et al. | 428/228 |
| 5,836,715 A | 11/1998 | Hendrix | 404/134 |
| 5,876,829 A * | 3/1999 | Dupont et al. | 428/144 |
| 5,945,356 A * | 8/1999 | Pott | 442/57 |

FOREIGN PATENT DOCUMENTS

DE 29722652 U1 5/1998

OTHER PUBLICATIONS

Understanding Textiles, Fifth Edition, Phyllis G. Tortora and Billie J. Collier an imprint of Prentice Hall Upper Saddle River, NJ.*

* cited by examiner

Primary Examiner—Marie Yamnitzky
Assistant Examiner—Camie S Thompson
(74) Attorney, Agent, or Firm—Townsend and Townsend and Crew LLP

(57) ABSTRACT

The areally extended composite material (1) contains fibers (20, 30) which are impregnated with plastic (21). The composite material comprises at least two arrays of parallel fiber cords (2, 3) which extend in different directions and which form a web, mesh or grid. The fiber cords can be bundle-like or band-like. The fibers (20) of a first array (2) are impregnated with substantially more plastic (21) than the fibers (30) of a second and possibly of a further array (3). The composite material (1) is stiff in the direction of the fibers of the first array and is flexible transversely to this direction. Openings advantageously exist between the fiber cords.

11 Claims, 2 Drawing Sheets

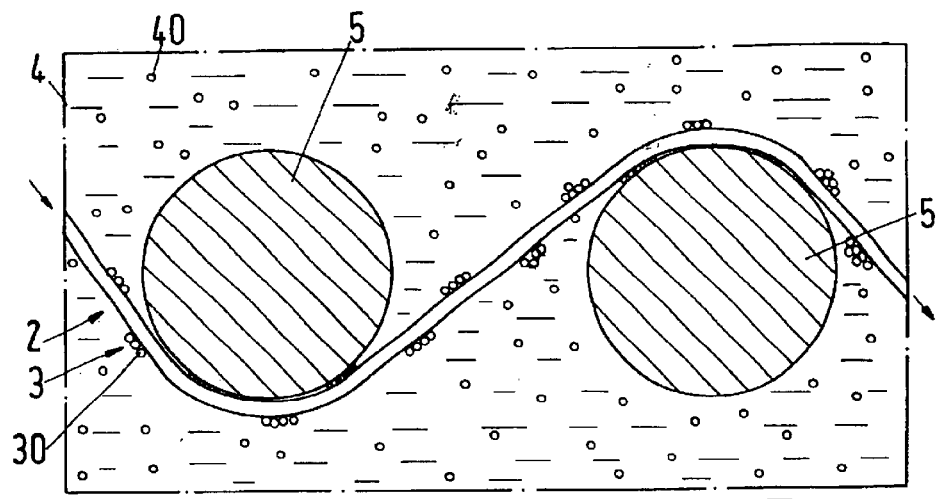

AREALLY EXTENDED COMPOSITE MATERIAL WITH FIBERS AND PLASTIC IMPREGNATION

BACKGROUND OF THE INVENTION

The invention relates to an areally extended composite material with fibers and plastic impregnation, and to methods for the manufacture of and to uses of composite materials of this kind.

A method, namely a pressure impregnation, is known from DE-A-41 21 915 in which an endless reinforcement fiber cord is impregnated with a thermoplastic polymer. In this method the fiber cord is first impregnated with firm thermoplastic particles in a bath which contains a dispersion of the particles. After the impregnation bath the dispersion medium is evaporated out of the impregnated fiber cord in a drying oven. Then the dry fiber cord is passed through an oven in which the particles melt. After a consolidation a small band-like fiber composite material with a firm polymer matrix is present. Small bands of this kind can be arranged to form webs, meshes or grids and formed to areally extended composite materials through a pultrusion in which the polymer matrix is temporarily melted again. Composite materials of this kind can also be brought into the shape of a profiled bar.

Areally extended composite materials are suitable for reinforcing components which are used in building construction, vehicle construction, light construction or the construction of apparatuses and devices. For reinforcement the composite material is applied to the component with a connecting medium, i.e. with an adhesive.

In reinforcements of components, flexible webs of fiber cords are also used which are adhesively bonded with a plastic mass onto partial surfaces of the component to be reinforced. Reinforcements of this kind are carried out primarily at curved surfaces and at edges. In practice however problems occur in this reinforcing method. The fiber cords of the flexible web can be displaced with respect to one another so that an irregular structure easily arises which is deformed by humps. A web which is deformed in this manner can no longer be applied flatly onto the surface to be reinforced. For a maximum stiffness and strength of the reinforcement, the fibers would have to be completely aligned; a fiber alignment of this kind is however not possible with a deformed web.

SUMMARY OF THE INVENTION

It is an object of the invention to create an areally extended composite material and methods for manufacturing composite materials of this kind which are suitable for the reinforcement of curved surfaces and edges.

The areally extended composite material contains fibers which are impregnated with plastic. The composite material comprises at least two arrays of parallel fiber cords which extend in different directions and which form a web, mesh or grid. The fiber cords can be bundle-like or band-like. The fibers of a first array are impregnated with substantially more plastic than the fibers of a second and possibly of a further array. The composite material is stiff in the direction of the fibers of the first array and is flexible transversely to this direction. Openings advantageously exist between the fiber cords.

Using the composite material in accordance with the invention, which is semi-flexible, components in the above-named fields can be reinforced at edges or cylindrical partial surfaces. In this it can be adhesively bonded or welded on in one or more layers. During the adhesive bonding it is advantageous when openings exist between the fiber cords. Thanks to the partial stiffening and a mutual fixing of the fiber cords, which are arranged transversely to one another, the danger of unfavorable deformations of the composite material in accordance with the invention is excluded.

The invention will be explained in the following with reference to the drawings.

BRIEF DESCRIPTION OF THE DRAWINGS

FIG. 1 is a detail of an impregnation bath,

FIG. 2 is a cross-section through a composite material in accordance with the invention, FIG. 3 is an oblique view of a similar composite material.

DETAILED DESCRIPTION OF SPECIFIC EXEMPLARY EMBODIMENTS

Figure 4:
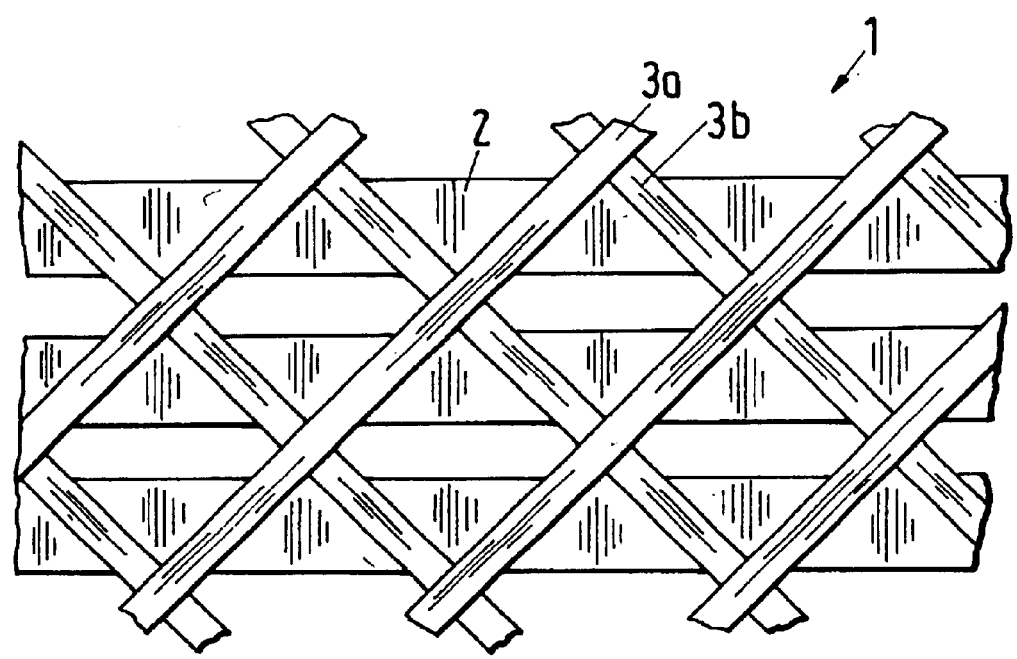
FIG. 4 is a plan view of a further embodiment of the composite material in accordance with the invention.

The impregnation method which is briefly explained in the introduction can be used in the manufacture of the composite material 1 in accordance with the invention. In this method, non-impregnated fiber cords 2 and 3, which can be bundle-like or band-like, are woven together to form a textile surface in a first step. In this the fiber cords 2 to be stiffened are used for forming a warp of the web. These fiber cords 2 form a first array of fiber cords. A second array is given through fiber cords 3, by means of which the weft insertion is carried out. A pressure impregnation, which is partly illustrated with reference to FIG. 1, follows as the second step of the method. The web is drawn through a dispersion 4 of an impregnation bath in the warp direction, i.e. in the direction of the fiber cords 2, and in this is guided under a tension force around cylindrical deflection bolts 5. During this the impregnation takes place. The further steps such as drying and melting of the thermoplastic are carried out as in the known pressure impregnation.

At the deflection bolts 5, the cords 2, which are composed of fibers 20, are spread transversely to the transport direction and thermoplastic particles 40 from the dispersion 4 are embedded between the fibers 20. At every deflection about a bolt 5 an amount of thermoplastic is taken up which depends on the concentration of the bath and on the fiber diameter. The cords 3, which are woven in transversely to the fiber cords 2 g and which are composed of fibers 30, also take up thermoplastic particles 40, however to a lesser extent, since the cords 3 are not spread. This is desirable since a semi-flexibility of the composite material 1 to be manufactured which is aspired to results in this manner: In this product the fibers 20 of the first array should be impregnated with substantially more plastic than the fibers 30 of the second array, so that the composite material 1 is stiff in the direction of the fibers 20 of the first array and is flexible transversely to this direction.

FIG. 2 shows a cross-section through the manufactured composite material 1, which is built up through two arrays of fiber cords 2 and 3 which are crossed at binding points 7 (see FIG. 3). Fibers 20 which are largely completely impregnated, i.e. embedded into a polymer matrix 21, form the fiber cords 2, which have a lens-shaped cross-section in the present exemplary embodiment. The transversely extending fiber cords 3 (or cord 3', lying further behind and being illustrated in broken lines) are impregnated with only a small proportion of thermoplastic, so that a good flexibility is retained. FIG. 3 illustrates the semi-flexibility of the composite material 1, with which narrow bending radii transverse to the fiber cords 2 are possible. Openings 6 between the fiber cords 2, 3, 3', which are advantageous for an adhesive bonding of the composite material 1 on a component to be reinforced, are also shown in FIG. 3.

It is advantageous when the fibers 20 of the first array have a substantially smaller diameter than the fibers 30 of the second array; since the greater the diameters of the fibers 30 are, the lesser is the impregnation of the cords 3 for the same method parameters (concentration and size of the thermoplastic particles 40; number of the deflection bolts 5). For example carbon fibers can be chosen for the fine fibers 20 of the first array and glass fibers can be chosen for the coarse fibers 30 of the second array. The fiber cords 2 of the first array should have an impregnation which—in relation to the maximum capacity of plastic which can be taken up—amounts to at least 35%. The impregnation of the further fiber cords 3 should be less than 20%, preferably less than 5%.

The plastic for the impregnation is advantageously a thermoplastic or consists largely of such. It can also contain a small proportion of pulverized duroplastic and/or pulverized inorganic material.

A further manufacturing method consists in that stiff impregnated fiber cords are woven together with non-impregnated fiber cords to form a textile surface in a first step, with the non-impregnated fiber cords being used for forming a warp of the web. In a second step for carrying out a pressure impregnation, the web is again drawn through an impregnation bath in the warp direction and an only partial impregnation of less than 20%, preferably less than 5%—in relation to the maximum capacity of plastic which can be taken up—is carried out.

FIG. 4 is a plan view of a further embodiment of the composite material in accordance with the invention. Here the flexible fiber cords 3a and 3b form a second and a third array. In this embodiment, stiff impregnated fiber cords 2, which are arranged parallel to one another, have been welded together with flexible impregnated fiber cords 3a and 3b to form a grid. Here the cords 3a and 3b form two arrays of fiber cords. The welding is carried out in accompaniment with a partial melting of the plastic impregnation and a pressing together of the fiber cords 2, 3a and 3b. The fiber cords 3a can for example also be secured on the rear side of the fiber cords 2 instead of on the same side as the fiber cords 3b.

What is claimed is:

1. An areally extended composite material including fibers and thermoplastic impregnations, the material comprising at least two arrays of parallel fiber cords that may be a bundle or band the two arrays extending in different directions, forming a web, mesh or grid, wherein the fibers of the first array are impregnated with more thermoplastic then the fibers of a second array such that the composite material is stiff in a direction of the fibers of the first array and is flexible transversely to said direction, and wherein openings exist between the fiber cords.

2. An areally extended composite material in accordance with claim 1 wherein the fiber cords are one of either a bundle or band.

3. An areally extended composite material in accordance with claim 1 wherein the fibers of the first array are impregnated with more plastic than the fibers of a third array.

4. An areally extended composite meterial in accordance with claim 1 where the composite material is built up through two arrays of fiber cords that cross at binding points and thus form one of a web or a mesh.

5. An areally extended composite material in accordance with claim 1 wherein the fiber cords of the first array have an impregnation that, in relation to a maximum capacity of plastic that is possible to be taken up, is at least 35%, and wherein the impregnation of fiber cords of a third array is less than 20%.

6. An areally extended composite material in accordance with claim 5 wherein the impregnation of the fiber cords of the third array is less than 5%.

7. An areally extended composite material in accordance with claim 1 wherein at least one of a pulverized duroplastic and a pulverized inorganic metal is mixed with the plastic for the impregnation.

8. An areally extended composite material in accordance with claim 1 wherein the fibers of the first array have a smaller diameter than the fibers of the second array.

9. An areally extended composite material in accordance with claim 8 wherein the fibers of the first array have a smaller diameter than the fibers of a third array.

10. An areally extended composite material in accordance with claim 8 wherein the fibers of the first array consist of carbon and the fibers of the second array consist of glass.

11. An areally extended composite material in accordance with claim 9 wherein the fiber of a third array consist of glass.

* * * * *